US008541719B2

(12) United States Patent
Steurer

(10) Patent No.: US 8,541,719 B2
(45) Date of Patent: Sep. 24, 2013

(54) SYSTEM FOR REDUCED PEAK POWER CONSUMPTION BY A COOKING APPLIANCE

(75) Inventor: Brian M. Steurer, Louisville, KY (US)

(73) Assignee: General Electric Company, Schenectady, NY (US)

(*) Notice: Subject to any disclaimer, the term of this patent is extended or adjusted under 35 U.S.C. 154(b) by 182 days.

(21) Appl. No.: 12/913,129

(22) Filed: Oct. 27, 2010

(65) Prior Publication Data
US 2011/0095017 A1 Apr. 28, 2011

Related U.S. Application Data

(63) Continuation-in-part of application No. 12/559,597, filed on Sep. 15, 2009.

(60) Provisional application No. 61/097,082, filed on Sep. 15, 2008.

(51) Int. Cl.
H05B 1/02 (2006.01)
(52) U.S. Cl.
USPC ........... 219/493; 219/485; 219/486; 219/519; 219/414; 307/39
(58) Field of Classification Search
CPC ........................................................ H05B 1/02
USPC ................ 219/492, 494, 483–486, 507–508, 219/497, 412–414; 307/38–42
See application file for complete search history.

(56) References Cited

U.S. PATENT DOCUMENTS

| 2,545,054 A | 3/1951 | Stitz |
| 3,683,343 A | 8/1972 | Feldman et al. |
| 3,720,073 A | 3/1973 | McCarty |
| 4,048,812 A | 9/1977 | Thomason |
| 4,167,786 A | 9/1979 | Miller et al. |
| 4,190,756 A | 2/1980 | Foerstner |

(Continued)

FOREIGN PATENT DOCUMENTS

| CN | 1692317 A | 11/2005 |
| CN | 101013979 A | 8/2007 |

(Continued)

OTHER PUBLICATIONS

International Search Report from PCT Application No. PCT/US2009/056878, Nov. 17, 2009.

(Continued)

Primary Examiner — Mark Paschall
(74) Attorney, Agent, or Firm — Global Patent Operation; Marc A. Vivenzio

(57) ABSTRACT

According to one aspect of the present disclosure, a system for reducing peak power consumption in an electromechanically controlled cooking appliance is provided. The system comprises a surface heating unit comprising at least one duty cycle controlled surface heating element, a temperature controlled oven heating element, a controller configured to receive and process utility state signals indicative of the operating state of an associated utility, and a switch responsive to the controller, switchable between a first state and a second state for selectively coupling the oven heating element to a first relatively high voltage power supply and a second relatively low voltage power supply respectively. The controller is configured to switch the switch to the first and second states as a function of the utility state signal.

20 Claims, 12 Drawing Sheets

(56) References Cited

U.S. PATENT DOCUMENTS

| | | | |
|---|---|---|---|
| 4,216,658 | A | 8/1980 | Baker et al. |
| 4,247,786 | A | 1/1981 | Hedges |
| 4,362,970 | A | 12/1982 | Grady |
| 4,454,509 | A | 6/1984 | Buennagel et al. |
| 4,637,219 | A | 1/1987 | Grose |
| 4,659,943 | A | 4/1987 | Virant |
| 4,718,403 | A | 1/1988 | McCall |
| 4,731,547 | A | 3/1988 | Alenduff et al. |
| 4,903,502 | A | 2/1990 | Hanson et al. |
| 4,998,024 | A | 3/1991 | Kirk et al. |
| 5,040,724 | A | 8/1991 | Brinkruff et al. |
| 5,137,041 | A | 8/1992 | Hall et al. |
| 5,183,998 | A | 2/1993 | Hoffman et al. |
| 5,220,807 | A | 6/1993 | Bourne et al. |
| 5,224,355 | A | 7/1993 | So et al. |
| 5,230,467 | A | 7/1993 | Kubsch et al. |
| 5,289,362 | A | 2/1994 | Liebl et al. |
| 5,408,578 | A | 4/1995 | Bolivar |
| 5,430,430 | A | 7/1995 | Gilbert |
| 5,451,843 | A | 9/1995 | Kahn et al. |
| 5,462,225 | A | 10/1995 | Massara et al. |
| 5,479,157 | A | 12/1995 | Suman et al. |
| 5,479,558 | A | 12/1995 | White et al. |
| 5,481,140 | A | 1/1996 | Maruyama et al. |
| 5,495,551 | A | 2/1996 | Robinson et al. |
| 5,504,306 | A | 4/1996 | Russell et al. |
| 5,505,377 | A | 4/1996 | Weiss |
| 5,515,692 | A | 5/1996 | Sterber et al. |
| 5,574,979 | A | 11/1996 | West |
| 5,581,132 | A * | 12/1996 | Chadwick ............... 307/38 |
| 5,635,895 | A | 6/1997 | Murr |
| 5,706,191 | A | 1/1998 | Bassett et al. |
| 5,761,083 | A | 6/1998 | Brown et al. |
| 5,816,491 | A | 10/1998 | Berkeley et al. |
| 5,866,880 | A | 2/1999 | Seitz et al. |
| 5,874,902 | A | 2/1999 | Heinrich et al. |
| 5,880,536 | A | 3/1999 | Mardirossian |
| 5,883,802 | A | 3/1999 | Harris |
| 5,886,647 | A | 3/1999 | Badger et al. |
| 5,926,776 | A | 7/1999 | Glorioso et al. |
| 5,937,942 | A | 8/1999 | Bias et al. |
| 5,956,462 | A | 9/1999 | Langford |
| 6,018,150 | A | 1/2000 | Maher |
| 6,026,651 | A | 2/2000 | Sandelman |
| 6,080,971 | A | 6/2000 | Seitz |
| 6,118,099 | A | 9/2000 | Lake |
| 6,179,213 | B1 | 1/2001 | Gibino et al. |
| 6,185,483 | B1 | 2/2001 | Drees |
| 6,229,433 | B1 | 5/2001 | Rye et al. |
| 6,246,831 | B1 | 6/2001 | Seitz et al. |
| 6,380,866 | B1 | 4/2002 | Sizer et al. |
| 6,400,103 | B1 | 6/2002 | Adamson |
| 6,480,753 | B1 | 11/2002 | Calder et al. |
| 6,489,597 | B1 | 12/2002 | Hornung |
| 6,553,595 | B1 | 4/2003 | Bruntz et al. |
| 6,631,622 | B1 | 10/2003 | Ghent et al. |
| 6,694,753 | B1 | 2/2004 | Lanz et al. |
| 6,694,927 | B1 | 2/2004 | Pouchak et al. |
| 6,704,401 | B2 | 3/2004 | Piepho et al. |
| 6,778,868 | B2 | 8/2004 | Imamura et al. |
| 6,784,872 | B1 | 8/2004 | Matsui et al. |
| 6,806,446 | B1 | 10/2004 | Neale |
| 6,817,195 | B2 | 11/2004 | Rafalovich et al. |
| 6,828,695 | B1 | 12/2004 | Hansen |
| 6,860,431 | B2 | 3/2005 | Jayadev |
| 6,873,876 | B1 | 3/2005 | Aisa |
| 6,879,059 | B2 | 4/2005 | Sleva |
| 6,904,385 | B1 | 6/2005 | Budike |
| 6,922,598 | B2 | 7/2005 | Lim et al. |
| 6,943,321 | B2 | 9/2005 | Carbone et al. |
| 6,961,642 | B2 | 11/2005 | Horst |
| 6,983,210 | B2 | 1/2006 | Matsubayashi et al. |
| 7,010,363 | B2 | 3/2006 | Donnelly et al. |
| 7,039,575 | B2 | 5/2006 | Juneau |
| 7,043,380 | B2 | 5/2006 | Rodenberg et al. |
| 7,053,790 | B2 | 5/2006 | Jang et al. |
| 7,057,140 | B2 | 6/2006 | Pittman |
| 7,069,090 | B2 | 6/2006 | Huffington et al. |
| 7,082,380 | B2 | 7/2006 | Wiebe et al. |
| 7,110,832 | B2 | 9/2006 | Ghent |
| 7,155,305 | B2 | 12/2006 | Hayes et al. |
| 7,164,851 | B2 | 1/2007 | Sturm et al. |
| 7,206,670 | B2 | 4/2007 | Pimputkar et al. |
| 7,266,962 | B2 | 9/2007 | Montuoro et al. |
| 7,274,973 | B2 | 9/2007 | Nichols et al. |
| 7,274,975 | B2 | 9/2007 | Miller et al. |
| 7,372,002 | B2 | 5/2008 | Nakamura et al. |
| 7,420,293 | B2 | 9/2008 | Donnelly et al. |
| 7,446,646 | B2 | 11/2008 | Huomo |
| 7,478,070 | B2 | 1/2009 | Fukui et al. |
| 7,541,941 | B2 | 6/2009 | Bogolea et al. |
| 7,561,977 | B2 | 7/2009 | Horst et al. |
| 7,565,813 | B2 | 7/2009 | Pouchak |
| 7,685,849 | B2 | 3/2010 | Worthington |
| 7,720,035 | B2 | 5/2010 | Oh et al. |
| 7,751,339 | B2 | 7/2010 | Melton et al. |
| 7,783,390 | B2 | 8/2010 | Miller |
| 7,919,729 | B2 | 4/2011 | Hsu |
| 7,925,388 | B2 | 4/2011 | Ying |
| 7,962,248 | B2 * | 6/2011 | Flohr ............... 700/291 |
| 7,991,513 | B2 | 8/2011 | Pitt |
| 8,024,073 | B2 | 9/2011 | Imes et al. |
| 8,027,752 | B2 | 9/2011 | Castaldo et al. |
| 8,033,686 | B2 | 10/2011 | Recker et al. |
| 8,094,037 | B2 | 1/2012 | Unger |
| 8,185,252 | B2 | 5/2012 | Besore |
| 8,190,302 | B2 * | 5/2012 | Burt et al. ............... 700/295 |
| 8,355,748 | B2 | 1/2013 | Abe et al. |
| 8,367,984 | B2 | 2/2013 | Besore et al. |
| 2001/0025349 | A1 | 9/2001 | Sharood et al. |
| 2001/0048361 | A1 | 12/2001 | Mays et al. |
| 2002/0024332 | A1 | 2/2002 | Gardner |
| 2002/0071689 | A1 | 6/2002 | Miyamoto |
| 2002/0125246 | A1 | 9/2002 | Cho et al. |
| 2002/0175806 | A1 | 11/2002 | Marneweck et al. |
| 2002/0196124 | A1 | 12/2002 | Howard et al. |
| 2002/0198629 | A1 | 12/2002 | Ellis |
| 2003/0036820 | A1 | 2/2003 | Yellepeddy et al. |
| 2003/0043845 | A1 | 3/2003 | Lim et al. |
| 2003/0178894 | A1 | 9/2003 | Ghent |
| 2003/0193405 | A1 | 10/2003 | Hunt et al. |
| 2003/0194979 | A1 | 10/2003 | Richards et al. |
| 2003/0233201 | A1 | 12/2003 | Horst et al. |
| 2004/0024483 | A1 | 2/2004 | Holcombe |
| 2004/0034484 | A1 | 2/2004 | Solomita et al. |
| 2004/0098171 | A1 * | 5/2004 | Horst ............... 700/295 |
| 2004/0100199 | A1 | 5/2004 | Yang |
| 2004/0107510 | A1 | 6/2004 | Buckroyd et al. |
| 2004/0112070 | A1 | 6/2004 | Schanin |
| 2004/0117330 | A1 * | 6/2004 | Ehlers et al. ............... 705/412 |
| 2004/0118008 | A1 | 6/2004 | Jeong et al. |
| 2004/0128266 | A1 | 7/2004 | Yellepeddy et al. |
| 2004/0133314 | A1 | 7/2004 | Ehlers et al. |
| 2004/0139038 | A1 | 7/2004 | Ehlers et al. |
| 2004/0254654 | A1 | 12/2004 | Donnelly et al. |
| 2005/0011205 | A1 | 1/2005 | Holmes et al. |
| 2005/0134469 | A1 | 6/2005 | Odorcic et al. |
| 2005/0138929 | A1 | 6/2005 | Enis et al. |
| 2005/0173401 | A1 | 8/2005 | Bakanowski et al. |
| 2005/0184046 | A1 | 8/2005 | Sterling |
| 2005/0190074 | A1 | 9/2005 | Cumeralto et al. |
| 2006/0031180 | A1 | 2/2006 | Tamarkin et al. |
| 2006/0036338 | A1 | 2/2006 | Harkcom et al. |
| 2006/0068728 | A1 | 3/2006 | Ishidoshiro et al. |
| 2006/0095164 | A1 | 5/2006 | Donnelly et al. |
| 2006/0123807 | A1 | 6/2006 | Sullivan et al. |
| 2006/0159043 | A1 | 7/2006 | Delp et al. |
| 2006/0190139 | A1 | 8/2006 | Reaume et al. |
| 2006/0208570 | A1 | 9/2006 | Christian et al. |
| 2006/0272830 | A1 | 12/2006 | Fima et al. |
| 2006/0276938 | A1 | 12/2006 | Miller |
| 2006/0289436 | A1 | 12/2006 | Carbone et al. |
| 2007/0005195 | A1 | 1/2007 | Pasquale et al. |
| 2007/0030116 | A1 | 2/2007 | Feher |

| | | |
|---|---|---|
| 2007/0043478 A1 | 2/2007 | Ehlers et al. |
| 2007/0136217 A1 | 6/2007 | Johnson et al. |
| 2007/0151311 A1 | 7/2007 | McAllister et al. |
| 2007/0185675 A1 | 8/2007 | Papamichael et al. |
| 2007/0203860 A1 | 8/2007 | Golden et al. |
| 2007/0213880 A1 | 9/2007 | Ehlers |
| 2007/0220907 A1 | 9/2007 | Ehlers |
| 2007/0229236 A1 | 10/2007 | Mercer et al. |
| 2007/0271006 A1 | 11/2007 | Golden et al. |
| 2007/0276547 A1 | 11/2007 | Miller |
| 2008/0029081 A1 | 2/2008 | Gagas et al. |
| 2008/0034768 A1 | 2/2008 | Pimentel et al. |
| 2008/0083729 A1 | 4/2008 | Etheredge et al. |
| 2008/0106147 A1 | 5/2008 | Caggiano et al. |
| 2008/0120790 A1 | 5/2008 | Ashrafzadeh et al. |
| 2008/0122585 A1 | 5/2008 | Castaldo et al. |
| 2008/0136581 A1 | 6/2008 | Heilman et al. |
| 2008/0144550 A1 | 6/2008 | Makhlouf et al. |
| 2008/0167756 A1 | 7/2008 | Golden et al. |
| 2008/0167931 A1 | 7/2008 | Gerstemeier et al. |
| 2008/0172312 A1 | 7/2008 | Synesiou et al. |
| 2008/0177678 A1 | 7/2008 | Di Martini et al. |
| 2008/0179052 A1 | 7/2008 | Kates |
| 2008/0204240 A1 | 8/2008 | Hilgers et al. |
| 2008/0215263 A1 | 9/2008 | Flohr |
| 2008/0258633 A1 | 10/2008 | Voysey |
| 2008/0272934 A1 | 11/2008 | Wang et al. |
| 2008/0277487 A1 | 11/2008 | Mueller et al. |
| 2009/0006878 A1 | 1/2009 | Borghetti et al. |
| 2009/0038369 A1 | 2/2009 | Vondras |
| 2009/0063257 A1 | 3/2009 | Zak et al. |
| 2009/0105888 A1 | 4/2009 | Flohr et al. |
| 2009/0146838 A1 | 6/2009 | Katz |
| 2009/0171862 A1 | 7/2009 | Harrod et al. |
| 2009/0235675 A1 | 9/2009 | Chang et al. |
| 2009/0240381 A1 | 9/2009 | Lane |
| 2009/0326728 A1 | 12/2009 | Chrisop et al. |
| 2010/0017242 A1 | 1/2010 | Hamilton et al. |
| 2010/0070091 A1 | 3/2010 | Watson et al. |
| 2010/0092625 A1 | 4/2010 | Finch et al. |
| 2010/0131117 A1 | 5/2010 | Mattiocco et al. |
| 2010/0175719 A1 | 7/2010 | Finch et al. |
| 2010/0179708 A1 | 7/2010 | Watson et al. |
| 2010/0262963 A1 | 10/2010 | Wassermann et al. |
| 2010/0301774 A1 | 12/2010 | Chemel et al. |
| 2011/0001438 A1 | 1/2011 | Chemel et al. |
| 2011/0062142 A1 | 3/2011 | Steurer |
| 2011/0085287 A1 | 4/2011 | Ebrom et al. |
| 2011/0087382 A1 | 4/2011 | Santacatterina et al. |
| 2011/0095017 A1 | 4/2011 | Steurer |
| 2011/0106328 A1 | 5/2011 | Zhou et al. |
| 2011/0114627 A1 | 5/2011 | Burt |
| 2011/0123179 A1 | 5/2011 | Roetker et al. |
| 2011/0148390 A1 | 6/2011 | Burt et al. |
| 2011/0181114 A1 | 7/2011 | Hodges et al. |
| 2011/0290781 A1 | 12/2011 | Burt et al. |
| 2012/0054123 A1 | 3/2012 | Broniak et al. |

FOREIGN PATENT DOCUMENTS

| | | |
|---|---|---|
| EP | 1496324 A1 | 1/2005 |
| GB | 2105127 A | 3/1983 |
| JP | 11313441 A2 | 11/1999 |
| KR | 20060085711 A | 7/2006 |
| WO | 86/00976 A1 | 2/1986 |
| WO | 90/12261 A1 | 10/1990 |
| WO | 98/48335 A1 | 10/1998 |
| WO | 2007/060059 A1 | 5/2007 |
| WO | 2007136456 A2 | 11/2007 |

OTHER PUBLICATIONS

International Search Report from PCT Application No. PCT/US2009/056882, Nov. 4, 2009.
International Search Report from PCT Application No. PCT/US2009/056883, Oct. 26, 2009.
International Search Report from PCT Application No. PCT/US2009/056886, Nov. 5, 2009.
International Search Report from PCT Application No. PCT/US2009/056889, Nov. 10, 2009.
International Search Report from PCT Application No. PCT/US2009/056894, Nov. 13, 2009.
International Search Report from PCT Application No. PCT/US2009/056895, Nov. 9, 2009.
International Search Report from PCT Application No. PCT/US2009/056901, Nov. 10, 2009.
International Search Report from PCT Application No. PCT/US2009/056906, Nov. 10, 2009.
International Search Report from PCT Application No. PCT/US2009/056913, Nov. 10, 2009.
International Search Report from PCT Application No. PCT/US2009/056914, Nov. 2, 2009.
International Search Report from PCT Application No. PCT/US2009/056919, Nov. 2, 2009.
Search Report from EP Application No. 10153695.1, May 24, 2012.
Real-Time Feedback, Natural Resources Canada via website www.nrcan.gc.ca , 2008, http://oee.nrcan.gc.ca/publications/equipment/10918.
International Search Report from PCT Application No. PCT/US2009/056911, Mar. 10, 2010.
Lemay et al., An Integrated Architecture for Demand Response Communications and Control, University of Illinois Urbana-Champaign, Oct. 28, 2008.
Search Report from CN Application No. 201010135268.8 dated Oct. 24, 2012.
Weisstein, Eric W. "At Least One.", From MathWorld—A Wolfram Web Resource. http://mathworld.wolfram.com/AtLeastOne.html, p. 1.

* cited by examiner

| RANGE CONTROL RESPONSE | | | LOW | MATCH TO FIG. 6B |
|---|---|---|---|---|
| RANGE CONTROL RESPONSE | PRIOR TO OPERATION | | FACTORY SETTINGS MODE | FACTORY SETTINGS MODE |
| | DURING OPERATION | | | IF IN SELF-CLEAN, FINISH THE CYCLE |
| | | | | MAX COOKING SETTING=HI |
| RANGE UI RESPONSE (DSM DISABLED) | PRIOR TO OPERATION | | DISPLAY NOTHING | DISPLAY NOTHING |
| | | | DISPLAY NOTHING | |
| | | | DISPLAY NOTHING | |
| RANGE UI RESPONSE (DSM ENABLED) | DURING OPERATION | | | DISPLAY NOTHING |

| MEDIUM | HIGH | CRITICAL |
|---|---|---|
| FACTORY SETTINGS MODE | FACTORY SETTINGS MODE | FACTORY SETTINGS MODE |
| FACTORY SETTINGS MODE | IF IN BAKE, BROIL OR PREHEAT CYCLE DURING THIS RATE, GO TO POWER SHARING MODE | IF IN BAKE, BROIL OR PREHEAT CYCLE DURING THIS RATE, GO TO POWER SHARING MODE |
| | PROHIBIT THE START OF SELF-CLEAN | PROHIBIT THE START OF SELF-CLEAN |
| | PROHIBIT THE START OF ANY COOKING FUNCTION IN THE LOWER OVEN | PROHIBIT THE START OF ANY COOKING FUNCTION IN THE LOWER OVEN |
| IF IN SELF-CLEAN, FINISH THE CYCLE | IF IN SELF-CLEAN, FINISH THE CYCLE | IF IN SELF-CLEAN, FINISH THE CYCLE |
| MAX COOKING SETTING=HI | MAX COOKING SETTING=8 | MAX COOKING SETTING=8 |
| | ONLY RIGHT FRONT BURNER ALLOWED TO BE TURNED ON | ONLY RIGHT FRONT BURNER ALLOWED TO BE TURNED ON |
| DISPLAY NOTHING | DISPLAY NOTHING | DISPLAY NOTHING |
| DISPLAY NOTHING | DISPLAY NOTHING | DISPLAY NOTHING |
| DISPLAY NOTHING | DISPLAY NOTHING | DISPLAY NOTHING |
| DISPLAY NOTHING | DISPLAY "ECO" LED | DISPLAY "ECO" LED |
| | FLASH "ECO" IN OVEN TEMPERATURE DIGITS AND GIVE ERROR BEEP IF UNALLOWED MODE IS ATTEMPTED | FLASH "ECO" IN OVEN TEMPERATURE DIGITS AND GIVE ERROR BEEP IF UNALLOWED MODE IS ATTEMPTED |

MATCH TO FIG. 6A

SYSTEM FOR REDUCED PEAK POWER CONSUMPTION BY A COOKING APPLIANCE

CROSS REFERENCE TO RELATED APPLICATIONS

The present application is a continuation-in-part of U.S. application Ser. No. 12/559,597, filed Sep. 15, 2009, which claims priority from U.S. Provisional Patent Application Ser. No. 61/097,082 filed 15 Sep. 2008; both of which are expressly incorporated herein by reference, in their entireties.

BACKGROUND OF THE DISCLOSURE

This disclosure relates to energy management, and more particularly to energy management of household consumer appliances. The disclosure finds particular application to cooking appliances and is particularly advantageously applied to such appliances with surface heating units and oven heating elements.

Currently utilities charge a flat rate, but with increasing cost of fuel prices and high energy usage at certain parts of the day, utilities have to buy more energy to supply customers during peak demand. Utility companies have to find ways to temporarily provide for this higher energy use, which comes at great expense to utility companies. Consequently, utilities are charging higher rates during peak demand. If the utility company can communicate that power is in high demand, home appliances, such as ranges that are typically used during peak time (later afternoon), could notify the consumer that demand is high and reduce peak power usage of the appliance and allow the utility company to shed load. This "demand response" capability in cooking appliances spread over thousands of customers would allow the utility company to shed a significant amount of peak load.

One solution that has been proposed is to provide a system where a control module "switches" the actual energy supply to the appliance or control unit on and off. However, there is no active control beyond the mere on/off switching.

Residential utility customers often have a plurality of electric surface elements for surface cooking and one or more ovens for baking and broiling. The surface elements and oven may be provided together in single appliance, for example a built-in or a free-standing range, or they may be provided separately in the form of a cooktop appliance and a wall oven. Typically, surface elements are used 2-3 times more often than the oven, and consume about the same peak power as the oven, but over half the amount of the time cycle. The best opportunity to shed power on surface elements is during high settings. At low settings, reducing power can result in undercooked food and since surface cooking is attended, the consumer can merely increase the power. High settings are typically initiated to perform non-direct-cooking related activities, such as boiling water. For normal cooking using surface elements, the element is set at settings on the order of 30% or less max power. However, for boiling, the maximum 100% power setting is used.

It is common during cooking for the oven and the surface elements to be used at the same time. During oven pre-heat, the oven operates at nearly 100% power. During this time, the surface elements may also operate at high power for functions such as boiling water. With the oven and the surface elements, on at the same time the cooking appliance may consume 6 kW or more of power.

While electronic surface unit controls can change or limit duty cycles in response to a "high demand", many ranges use electromechanical power switching devices that are not electronic, for example infinite switches for controlling energization of the surface elements while using electronic controls for controlling energization of the oven bake and broil elements. This system aims to provide a way to reduce peak and average power with minimal changes to the design of currently produced cooking appliances with electromechanically controlled surface cooking elements, in a cost effective manner. By implementing a simple control, this system is able to react to either a discrete normal demand or higher demand signal. Therefore, this system provides a simple, low cost method to shed both peak and average power that does not require relatively expensive and complex all electronic appliance control systems. It is proposed for the surface elements and the oven to share power and still perforin their intended functions by operating the oven at full power when no energy is being used by surface heating elements, and operating the oven at a reduced power level when energy is being used by the surface heating elements. This reduces the peak and average power consumed by the appliance. This system may be installed on existing products without adding expensive electronic surface control devices that require extensive system level software developments, safety critical hardware & and software interactions, etc.

BRIEF DESCRIPTION OF THE DISCLOSURE

According to one aspect of the present disclosure, a system for reducing peak power consumption in an electromechanically controlled cooking appliance is provided. The system comprises a surface heating unit comprising at least one duty cycle controlled surface heating element, a temperature controlled oven heating element, a controller configured to receive and process utility state signals indicative of the operating state of an associated utility, and a switch responsive to the controller, switchable between a first state and a second state for selectively coupling the oven heating element to a first relatively high voltage power supply and a second relatively low voltage power supply respectively. The controller is configured to switch the switch to the first and second states as a function of the utility state signal.

According to another aspect of the present disclosure, a power sharing method for reducing peak power consumption of a cooking appliance is provided. The cooking appliance includes at least one duty cycle controlled surface heating element and at least one oven heating element, wherein the at least one oven heating element is energized by a conventional 240 volt ac power supply. The method comprises receiving and processing utility state signals by a controller, the signals being indicative of the operating state of an associated utility, associating the at least one oven heating element to a demand response switch switchable between a first state and a second state, and switching the demand response switch between the first and second state to selectively couple the at least one oven heating element to a first relatively high voltage power supply and a second relatively low voltage power supply respectively.

According to yet another embodiment of the present disclosure, a power sharing system for reducing peak power consumption of a cooking appliance during an energy savings mode is provided. The system comprises a surface heating unit comprising at least one surface heating element operative according to a duty cycle, an oven cavity, having one or more oven heating elements, a controller configured to receive and process a signal indicative of a current utility state of an associated utility and operative to implement an energy saving mode in response to a signal indicative of a high demand state, a demand response switch arrangement responsive to the controller and to the operating state of the surface heating unit. The demand response switch arrangement is operative in the energy saving mode to enable energization of the oven element by a first relatively high voltage supply when the surface unit is not energized and to enable energization of the oven element by a second relatively low voltage supply when the surface heating unit is energized.

Still other features and benefits of the present disclosure will become apparent from reading and understanding the following detailed description.

BRIEF DESCRIPTION OF THE DRAWINGS

FIG. 6(a) is an exemplary control response for the cooking appliance of FIG. 4.

FIG. 6(b) is an exemplary control response for the cooking appliance of FIG. 4.

DETAILED DESCRIPTION OF THE PREFERRED EMBODIMENTS

Figure 1:
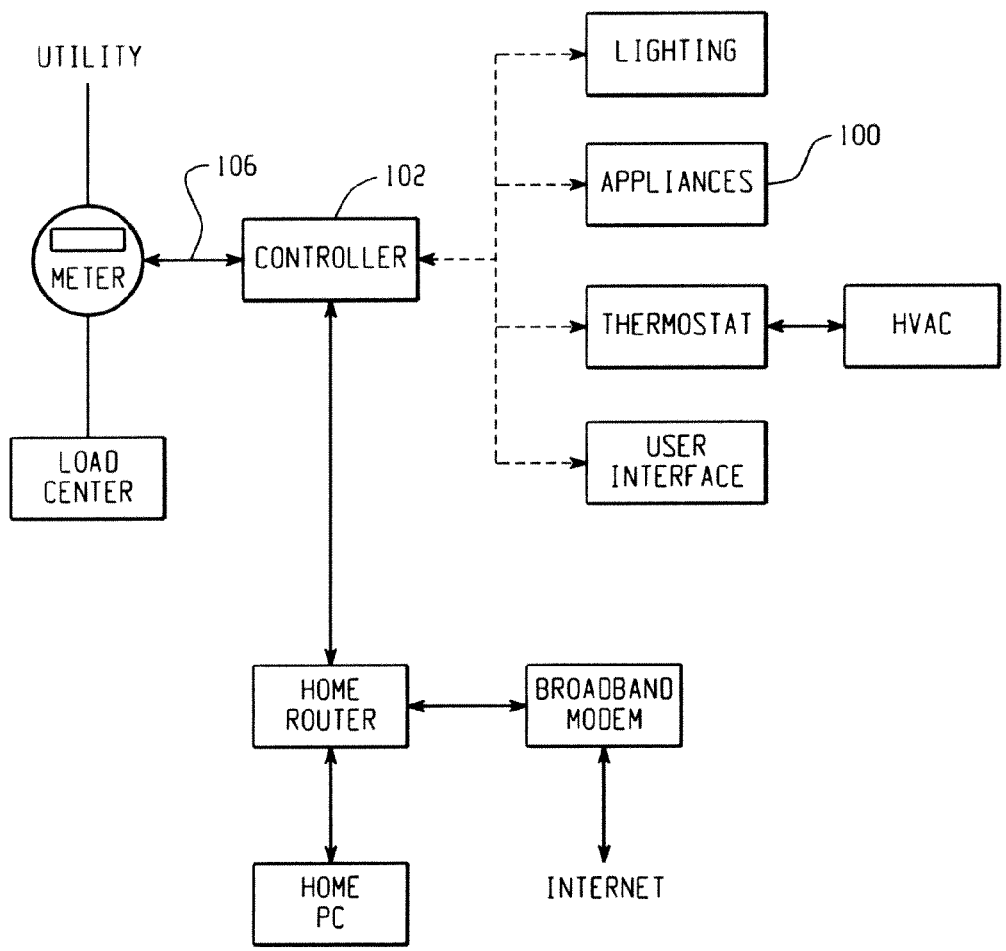
FIGS. 1-2 illustrate exemplary embodiments of an energy management system for household appliances.
Figure 2:
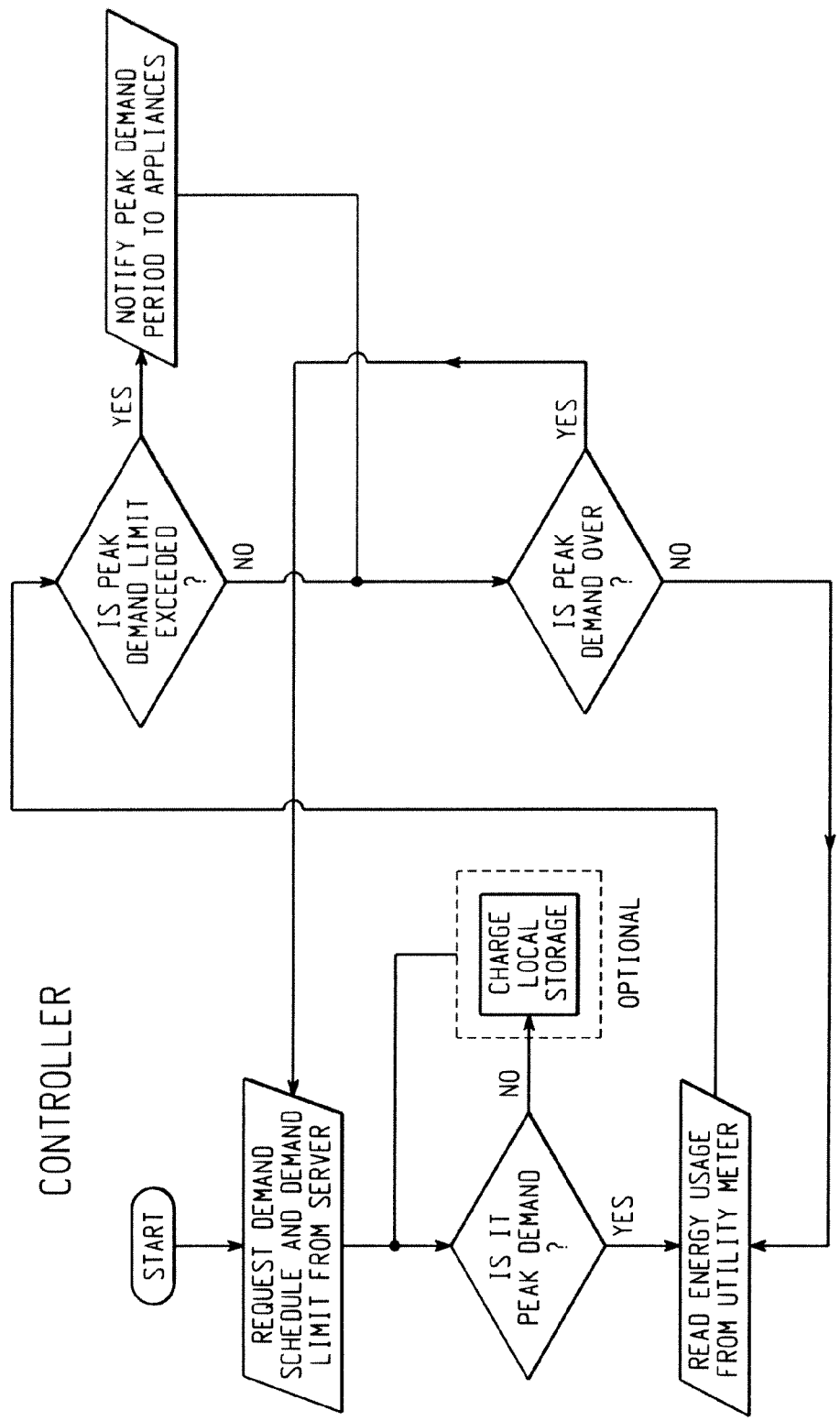

An exemplary embodiment of an energy management system for household appliances is illustrated in FIG. 1. An electronic controller is provided for communicating with a utility meter and reducing power consumption in response to a peak demand period. A utility meter can also provide the controller the occurrence of peak demand and demand limit. The demand limit can also be set by the home owner. Additionally, the homeowner can choose to force various modes in the appliance control based on the rate the utility is charging at different times of the day. The controller will look at the energy consumption currently used by the home via the utility meter and see if the home is exceeding the demand limit read from the server. If the demand limit is exceeded, the controller will notify the intelligent appliances, lighting and thermostat/HVAC (FIG. 2).

Figure 3:
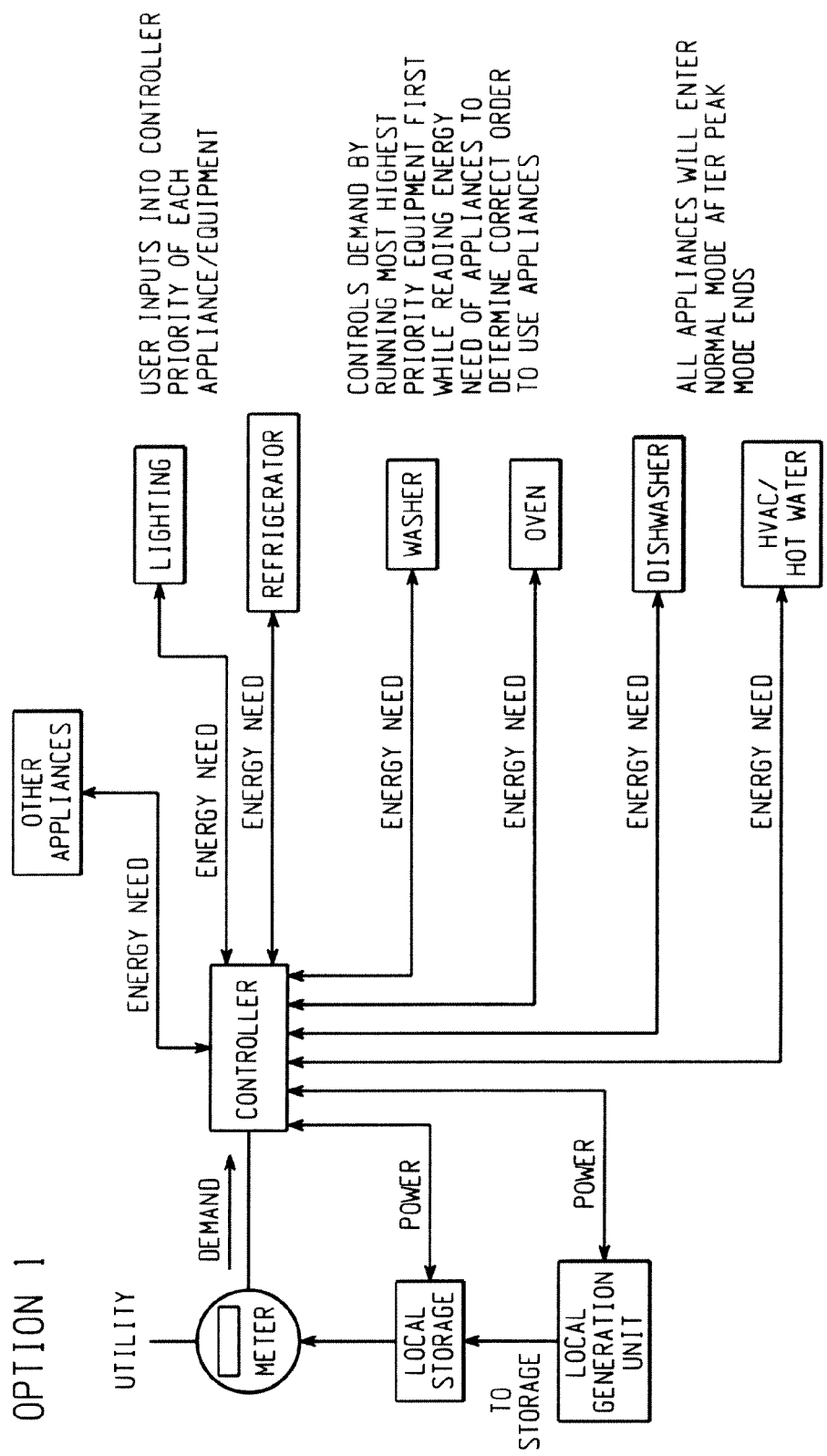
FIG. 3 illustrates an exemplary embodiment of an energy management system for household appliances.

The interaction between controller and appliances can occur in various ways. For example, in one scenario during a peak demand period, the controller will receive a demand limit from the utility, demand server or user. The controller will then allocate the home's demand based on two factors: priority of the appliance and energy need level (FIG. 3). The priority dictates which appliances have higher priority to be in full or partial energy mode than other appliances. Energy need dictates how much energy is required for a certain time period in order for that appliance to function properly. If the appliance's energy need is too low to function properly, the appliance moves to a normal mode or a higher energy need level. The energy saving mode is typically a lower energy usage mode for the appliance such as shutdowns of compressors and motors, delayed cycles, higher operating temperatures in summer or lower operating temperatures in winter until the peak demand period is over. Once the demand limit is reached, the appliances will stay in their energy mode until peak demand is over, or a user overrides, or appliance finishes need cycle or priority changes. The controller constantly receives status updates from the appliances in order to determine which state they are in and in order to determine if priorities need to change to accomplish the system goals.

How much energy the appliance consumes in peak demand is based on priority of the device and the energy need level. If the appliance's priority is high, then the appliance will most likely not go into a saving mode. The energy need level is based on how little energy the appliance can consume during peak demand and still provide the function setting it is in (i.e. in a refrigerator, ensuring that the temperature is cool enough to prevent spoiling). It will also be appreciated that an appliance may have multiple energy need levels.

Figure 4:
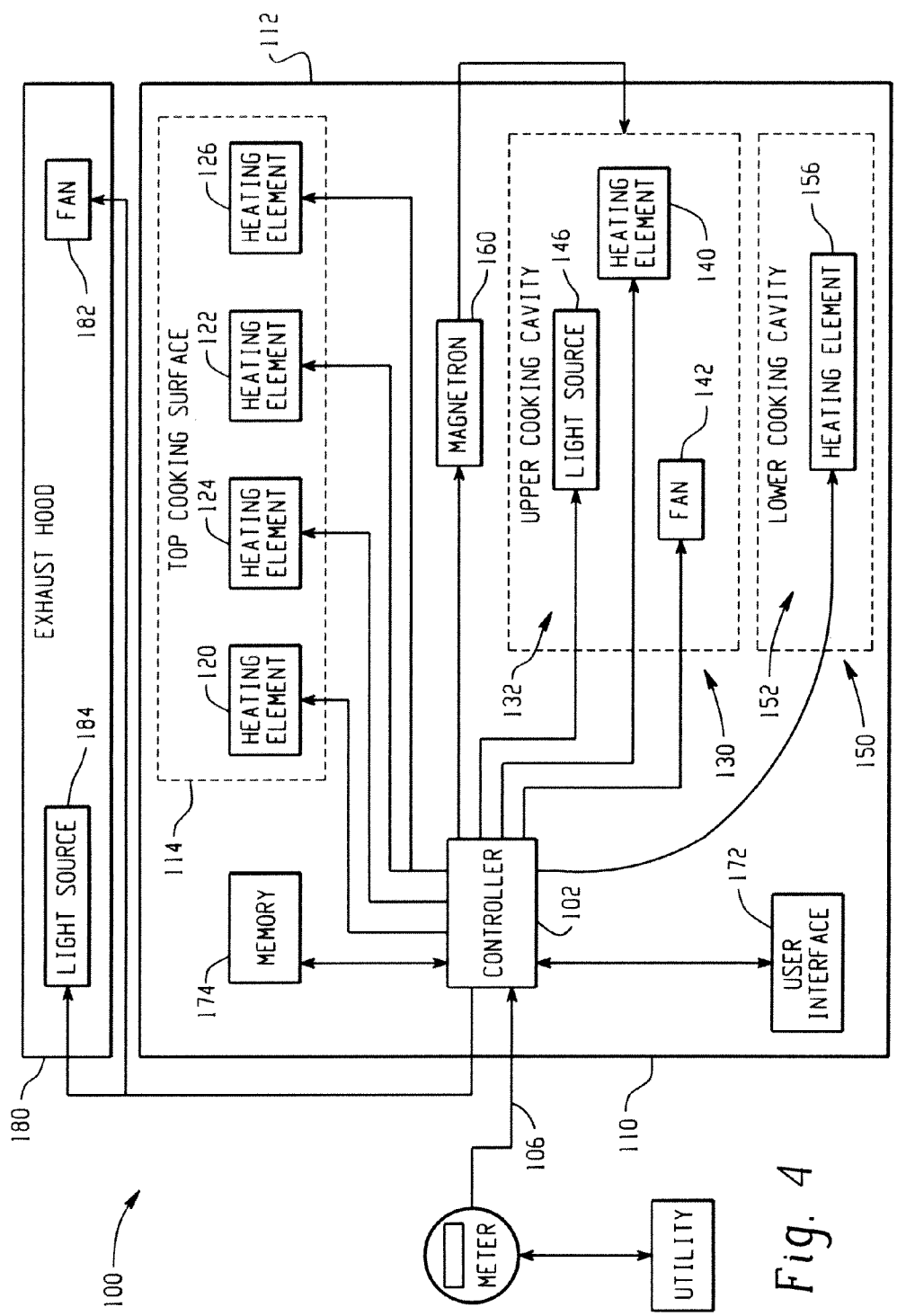
FIG. 4 is a schematic illustration of an exemplary demand managed cooking appliance.

A demand managed cooking appliance 100 is schematically illustrated in FIG. 4. The cooking appliance 100 comprises one or more power consuming features/functions and a controller 102 operatively connected to each of the power consuming features/functions. The controller 102 can include a micro computer on a printed circuit board which is programmed to selectively control the energization of the power consuming features/functions. The controller 102 is configured to receive and process a signal 106 indicative of a utility state, for example, availability and/or current cost of supplied energy. Signal 106 may be received from the smart utility meter or directly from the utility provider or indirectly via other communication links to the utility provider. The energy signal may be generated by a utility provider, such as a power company, and can be transmitted via a power line, as a radio frequency signal, or by any other means for transmitting a signal when the utility provider desires to reduce demand for its resources. The cost can be indicative of the state of the demand for the utility's energy, for example a relatively high price or cost of supplied energy is typically associated with a peak demand state or period and a relative low price or cost is typically associated with an off-peak demand state or period.

The controller 102 can operate the cooking appliance 100 in one of a plurality of operating modes, including a normal operating mode and an energy savings mode, in response to the received signal. Specifically, the cooking appliance 100 can be operated in the normal mode in response to a signal indicating an off-peak demand state or period and can be operated in an energy savings mode in response to a signal indicating a peak demand state or period. As will be discussed in greater detail below, the controller 102 is configured to at least one of selectively delay, adjust and disable at least one of the one or more power consuming features/functions to reduce power consumption of the cooking appliance 100 in the energy savings mode.

As shown in FIG. 4, the cooking appliance 100 is in the form of a free standing range 110 having a top cooking surface 114. Although, it should be appreciated that the cooking appliance 100 can be any suitable cooking appliance including, without limitation, counter top cooking appliances, built-in cooking appliances and multiple fuel cooking appliances. Therefore, the range 110 is provided by way of illustration rather than limitation, and accordingly there is no intention to limit application of the present disclosure to any particular cooking appliance.

The depicted exemplary range 110 includes an outer body or cabinet 112 with the top cooking surface 114 having at least one individual surface heating element. In the depicted embodiment, the top cooking surface 114 includes four individual surface heating elements, namely, a left front heating element 120, a right front heating element 122, a left rear heating element 124, and a right rear heating element 126. It should be apparent to those skilled in the art that top cooking surface 114 may include any suitable number of heating elements, any suitable type of heating elements (i.e., single, double or triple element which operates in different modes) and/or any suitable arrangement of the heating elements.

The exemplary range 110 includes an oven 130 positioned within the cabinet 112 and below cooking surface 114. The oven 130 defines a cooking chamber or cavity 132, which has a maximum setpoint temperature in the normal operating mode. A drop door (not shown) sealingly closes a front opening of the oven during a cooking process. A door latch is configured to lock the door in a closed position during the cooking process and/or during a self-cleaning operation. The cooking cavity 132 is configured to receive and support a food item during the cooking process. The cooking cavity can be provided with at least one heating element 140. For example, the cooking cavity can be provided with an upper heating element, such as a broil heating element, and a lower heating element, such as a bake heating element. The cooking cavity 132 can also be provided with a convection fan 142 operatively associated with the cooking cavity for circulating heated air within the cooking cavity and a light source 146 for illuminating the cooking cavity.

According to one exemplary embodiment, range 110 can include more than one cooking chamber or cavity. For example, the exemplary range 110 can includes a second oven 150 having a second cooking chamber or cavity 152. The second cooking cavity may be configured substantially similar to first cooking cavity 132 or may be configured differently. Additionally, the second cooking cavity 152 may be substantially similar in size to first cooking cavity 132 or may be larger or smaller than first cooking cavity 132. A drop door (not shown) sealingly closes a front opening of the second cooking chamber during the cooking process. Further, the second cooking chamber 152 is equipped with one or more suitable heating elements 156, such as a heating element and a lower heating element, as described above in reference to the cooking cavity 132.

According to another exemplary embodiment, the range 110 can further comprise an RF generation module including a magnetron 160 located on a side or top of the cooking cavity 132. The magnetron can be mounted to a magnetron mount on a surface of the cooking cavity. The magnetron is configured to deliver microwave energy into the cooking cavity 132. A range backsplash (not shown) can extend upward of a rear edge of top cooking surface 114 and can include, for example, a user interface 172, a control display and control selectors for user manipulation for facilitating selecting operative oven features, cooking timers, time and/or temperature displays. An exhaust hood 180 can be provided above the range 110. The exhaust hood can be operatively connected to the controller 102 and can include an exhaust fan 182 and a light source 184 for illuminating the top cooking surface 114.

In the normal operating mode, for use of the oven 130, a user generally inputs a desired temperature and time at which the food item placed in the cooking cavity 132 is to be cooked through at least one input selector. The controller 102 then initiates the cooking cycle. In one exemplary embodiment, the controller 102 is configured to cyclically energize and de-energize the heating element 140 and, if provided, in some cooking cycles, the magnetron 160 to heat the air and radiate energy directly to the food item. The duty cycle for the heating element 140 and magnetron 160, that is, the percent on time for the heating element and magnetron in a control time period, can depend on at least one of a pre-programmed cooking algorithm and a user selected operation mode. The length of time each component is on during a particular control period varies depending on the power level selected. The duty cycle, or ratio of the on time to the control period time, can be precisely controlled and is pre-determined by the operating parameters selected by the user. Different foods will cook best with different ratios. The oven 130 allows control of these power levels through both pre-programmed cooking algorithms and through user-customizable manual cooking. Energization of the heating element 140 during pre-heat depends on the target temperature corresponding to the cooking temperature selected by a user and the temperature of the cooking cavity 132 upon initiation of the oven 130.

In the normal operating mode, the user may select a desired oven temperature for a particular cooking operation. If the sensed temperature is below a selected temperature, the controller 102 is configured to energize the heating element 140 at 100% duty cycle at least until reaching a target temperature associated with the selected temperature and then cyclically energize the heating element 140 to maintain the selected temperature for the remainder a programmed cooking time.

Similarly, in using the one of the surface heating elements 120, 122, 124, 126 of the top cooking surface 114, if it is a temperature controlled surface heating element the user may select the desired temperature of the utensil heated by the surface element through a control selector. Each individual temperature controlled surface heating elements have a maximum setpoint temperature in the normal operating mode. If the surface element is not a temperature controlled element, the user selects the desired power setting for the surface element. The controller 102 controls the energization of the temperature controlled surface element to maintain the selected temperature by, for example, duty cycling the surface element. Similarly for the non-temperature controlled elements, each power setting has associated with it a particular duty cycle and the control applies the selected duty cycle to the surface heating element.

If the controller 102 receives and processes an energy signal indicative of a peak demand period at any time during operation of the appliance 100, the controller makes a determination of whether one or more of the power consuming features/functions should be operated in the energy savings mode and if so, it signals the appropriate features/functions of the appliance 100 to begin operating in the energy savings mode in order to reduce the instantaneous amount of energy being consumed by the appliance. The controller 102 determines what features/functions should be operated at a lower consumption level and what that lower consumption level should be, rather than an uncontrolled immediate termination of the operation of specific features/functions.

In order to reduce the peak energy consumed by the cooking appliance 100, the controller 102 is configured to at least one of selectively delay, adjust and disable operation of at least one of the one or more above described power consuming features/functions to reduce power consumption of the cooking appliance 100 in the energy savings mode. Reducing total energy consumed also encompasses reducing the energy consumed at peak times and/or reducing the overall electricity demands. Electricity demands can be defined as average watts over a short period of time, typically 5-60 minutes. Off peak demand periods correspond to periods during which lower cost energy is being supplied by the utility relative to peak demand periods. Operational adjustments that result in functional energy savings will be described in detail hereinafter.

The cooking cavity 132 has a maximum setpoint temperature in the normal operating mode. To reduce the power consumption of the oven 130 in the energy savings mode, the controller 102 is configured to reduce the maximum setpoint temperature in the energy savings mode. To this extent, the power of the heating element 140 of the cooking cavity 132 can be reduced by selectively adjusting the duty cycle of the heating element throughout a selected cooking cycle. The controller can disable or reduce the speed of the convection fan 142 and can disable or reduce the intensity of the light source 146.

If the range 110 includes the magnetron 160 when operating in the energy savings mode, the power level of the magnetron can be selectively adjusted to reduce the power consumed by the magnetron during subsequent operation.

During the energy savings mode, a pre-heat ramp rate is reduced to reduce demand. The controller 102 can also selectively disable the self clean feature in the energy savings mode. However, if the self clean feature was activated in the normal operating mode and the controller determines based on the cost of supplied energy that the cooking appliance 100 should operate in the energy savings mode, in the illustrative embodiment, the controller 102 will finish the self clean cycle then in progress. Alternatively, the controller could be configured to immediately interrupt the self-clean mode upon determining the appliance should operate in the energy savings mode and repeat the self-clean cycle after the energy signal signifies an off-peak period or the controller otherwise determines operation in the energy savings mode is no longer desired. As indicated above, the range 110 can include the second oven 150 having the second cooking cavity 152. With this setup, the controller 102 is configured to disable one of the cooking cavities 132, 152, particularly the second cooking cavity, in the energy savings mode.

Regarding the top cooking surface 114, each individual surface heating element 120, 122, 124, 126 has a maximum setpoint temperature in the normal operating mode. To reduce power of the top cooking surface 114, the controller 102 can limit the number of surface heating elements that can be energized and is configured to reduce the setpoint temperature of at least one activated temperature controlled surface heating element in the energy savings mode. The controller can also reduce power of an activated open loop surface heating element by selectively adjusting the duty cycle of the activated heating element. Further, in the energy savings mode, at least one surface heating element 120, 122, 124, 126 can be at least partially disabled.

To further reduce the power consumption of the appliance 100 in the energy savings mode, the controller 102 is configured to disable or reduce the speed of the exhaust fan 182 of the exhaust hood 180. The light source 184 can also be disabled or the intensity of the light source can be reduced.

The determination of which power consuming features/functions are operated in an energy savings mode may depend on whether the appliance 100 is currently operating. In one embodiment, the controller 102 includes functionality to determine whether activation of the energy savings mode for any power consuming features/functions would potentially cause damage to any feature/function of the appliance 100 itself or would cause the appliance to fail to perform its intended function, such as a complete cooking of food in the cooking cavity 132 of the oven 130. If the controller determines that an unacceptable consequence may occur by performing an energy saving action, such as deactivating or curtailing the operation of a particular power consuming feature/function in the appliance 100, the controller may opt-out of performing that specific energy saving action or may institute or extend other procedures. For example, the controller 102 may determine that the deactivation or limitation of the operation of the convection fan 142 may result in overheating of the heating element 140 which has not yet been deactivated or limited. As a result, the controller prevents the appliance from being damaged.

The controller may also determine whether deactivation or curtailment of operation of a power consuming feature/function would prevent the appliance from performing its desired function. For example, if the controller 102 determines that deactivation or curtailment of the heating element 140 would result in under-cooked food in the oven 130, the controller 102 may opt-out of performing that specific energy savings action or may increase the time that a function is performed, such as a length of cooking.

Figure 5:
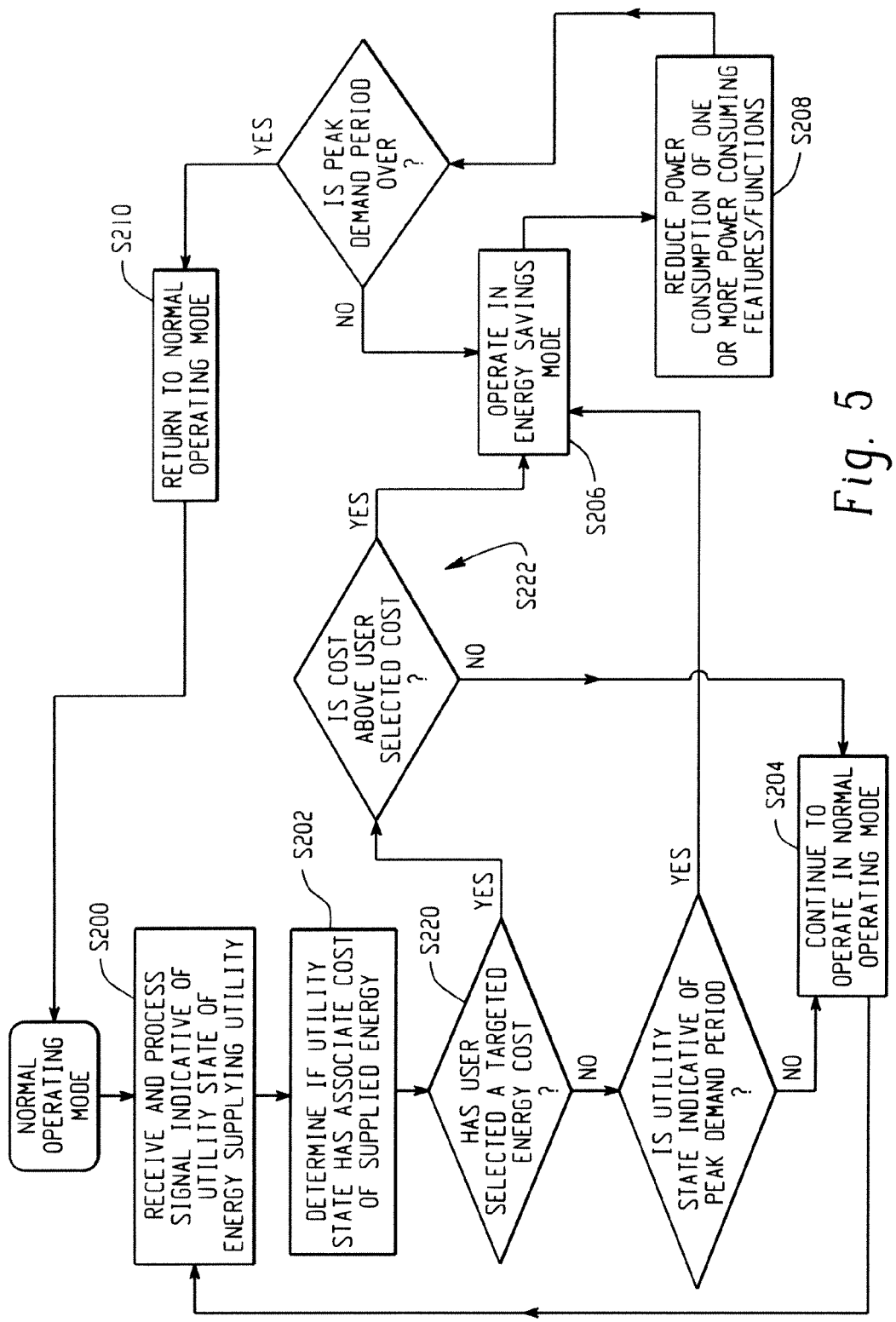
FIG. 5 is an exemplary operational flow chart for the cooking appliance of FIG. 4.

With reference to FIG. 5, a control method for the cooking appliance 100 comprises receiving and processing the signal indicative of cost of supplied energy (S200), determining a state for an associated energy supplying utility, such as a cost of supplying energy from the associated utility (S202), the utility state being indicative of at least a peak demand period or an off-peak demand period, operating the appliance 100 in a normal mode during the off-peak demand period (S204), operating the appliance in an energy savings during the peak demand period (S206), scheduling, delaying, adjusting and/or selectively deactivating operation of any number of one or more power consuming features/functions of the appliance 100 described above to reduce power consumption of the appliance in the energy savings mode (S208), and returning to the normal mode after the peak demand period is over (S210).

As indicated previously, the control panel or user interface 172 can include a display and control buttons for making various operational selections. The display can be configured to communicate active, real-time feedback to the user on the cost of operating the appliance 100. The costs associated with using the appliance 100 are generally based on the current operating and usage patterns and energy consumption costs, such as the cost per kilowatt hour charged by the corresponding utility. The controller 102 is configured to gather information and data related to current usage patterns as well as current power costs. This information can be used to determine current energy usage and cost associated with using the appliance 100 in one of the energy savings mode and normal mode. This real-time information (i.e., current usage patterns, current power cost and current energy usage/cost) can be presented to the user via the display.

It is to be appreciated that a manual or selectable override can be provided on the user interface 172 providing a user the ability to select which of the one or more power consuming features/functions are operationally delayed, adjusted and/or disabled by the controller in the energy savings mode. The user can override any adjustments, whether time related or function related, to any of the power consuming functions. Further, the user can override the current operating mode of the appliance 100. Particularly, as shown in FIG. 5, if the utility state has an associated energy cost, the user can base operation of the appliance on a user selected targeted energy cost, such a selected pricing tier or cost per kilowatt hour charged by the corresponding utility (S220). If the current cost exceeds the user selected cost, the controller 104 will operate the appliance 100 in the energy savings mode (S222).

If the current cost is less than the user selected cost, the controller 104 will operate the appliance 100 in the normal mode (S222). This operation based on a user selected targeted energy cost is regardless of the current energy cost being indicative of one of a peak demand period and an off-peak demand period.

The operational adjustments, particularly an energy savings operation can be accompanied by a display on the control panel which communicates activation of the energy savings mode. The energy savings mode display can include a display of "ECO", "Eco", "EP", "ER", "CP", "CPP", "DR", or "PP" on the appliance display panel in cases where the display is limited to three characters. In cases with displays having additional characters available, messaging can be enhanced accordingly. Additionally, an audible signal can be provided to alert the user of the appliance operating in the energy savings mode.

The duration of time that the appliance 100 operates in the energy savings mode may be determined by information in the energy signal. For example, the energy signal may inform the appliance 100 to operate in the energy savings mode for a few minutes or for one hour, at which time the appliance returns to normal operation. Alternatively, the energy signal may be continuously transmitted by the utility provider, or other signal generating system, as long as it is determined that instantaneous load reduction is necessary. Once transmission of the signal has ceased, the appliance 100 returns to normal operating mode. In yet another embodiment, an energy signal may be transmitted to the appliance to signal the appliance to operate in the energy savings mode. A normal operation signal may then be later transmitted to the appliance to signal the appliance to return to the normal operating mode.

The operation of the appliance 100 may vary as a function of a characteristic of the utility state and/or supplied energy, e.g., availability and/or price. Because some energy suppliers offer what is known as time-of-day pricing in their tariffs, price points could be tied directly to the tariff structure for the energy supplier. If real time pricing is offered by the energy supplier serving the site, this variance could be utilized to generate savings and reduce chain demand. Another load management program offered by energy supplier utilizes price tiers which the utility manages dynamically to reflect the total cost of energy delivery to its customers. These tiers provide the customer a relative indicator of the price of energy and are usually defined as being LOW, MEDIUM, HIGH and CRITICAL. The controller 102 is configured to operate the appliance in an operating mode corresponding to one of the price tiers. For example, the controller is configured to operate the cooking appliance 100 in the normal operating mode during each of the low and medium price tier and is configured to operate the appliance in the energy savings mode during each of the high and critical price tier. These tiers are shown in the chart of FIGS. 6(a) and (b) to partially illustrate operation of the appliance 100 in each pricing tier. In the illustrative embodiment the appliance control response to the LOW and MEDIUM tiers is the same namely the appliance remains in the normal operating mode. Likewise the response to the HIGH and CRITICAL tiers is the same, namely operating the appliance in the energy saving mode. However, it will be appreciated that the controller could be configured to implement a unique operating mode for each tier which provides a desired balance between compromised performance and cost savings/energy savings. If the utility offers more than two rate/cost conditions, different combinations of energy saving control steps may be programmed to provide satisfactory cost savings/performance tradeoff.

In the foregoing description, it is apparent that a fully electronically controlled range can respond to signals indicative of the operating state of the utility in a variety of ways. In accordance with one aspect of the present disclosure a system is provided which enables a cooking appliance with at least one temperature controlled oven heating element to reduce peak power consumption in response to such signals from a utility. Electromechanically controlled ranges or cooktops typically control energization of surface elements using infinite switches and provide temperature control of oven heating elements using electronic oven controls or electromechanical oven thermostats. In accordance with another aspect of the present disclosure a system is provided for controlling the sharing of power between at least one surface heating element and at least one oven heating element to reduce peak power consumption during periods of simultaneous usage in response to such signals from a utility.

It is common that during peak demand periods, at least one surface element is used simultaneously with the oven heating element during cooking, and it would not be desirable to completely cut off power to any of the heating elements in use. During a preheating period, oven heating elements are typically operated at nearly 100% power and once they reach the operating temperature, they typically operate at 25% or less to maintain the desired temperature in the oven. Additionally, surface elements employ a duty cycle and may be used on 100% duty cycle setting for boiling water, etc. If at least one surface element is in use at the same time as the oven element, together they may consume over 6 kilowatts of power. Therefore, a power sharing system is provided that reduces peak power consumption to reduce spikes in power demand and spread the power demand out over a slightly longer period. Although this method of power sharing may be accomplished with sophisticated and expensive control systems, the present system incorporates a simple demand response switch arrangement that can be implemented with only relatively minor changes to the design of conventional electromechanically controlled or partially electromechanically controlled cooking appliances or to the control algorithms of electronically controlled cooking appliances.

Figure 7A:
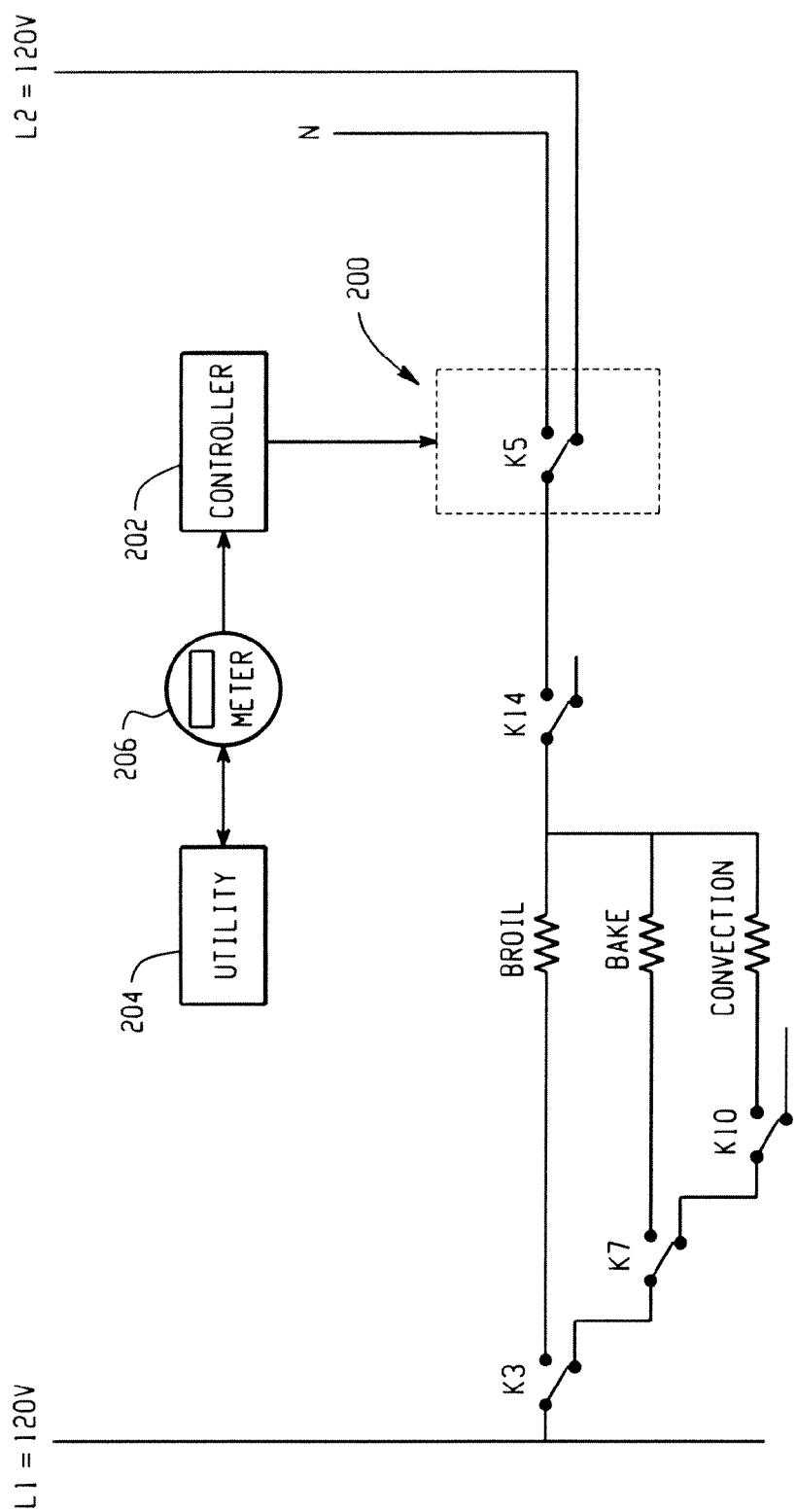
FIGS. 7(a) and 7(b) are simplified schematic diagrams of exemplary embodiments of a power control system for the oven of a cooking appliance including a Demand Response Relay responsive to a utility state signal.

FIG. 7(a), schematically illustrates a power control arrangement for reducing the peak power consumed by an oven of a cooking appliance in response to a signal from a utility signifying a peak demand or high cost operating state. In the example of FIG. 7(a), the cooking appliance is provided with three oven heating elements, a broil element, a bake element and a convection element. Power for energizing these elements is provided by a conventional 240 volt ac power supply comprising power lines L1, L2, and neutral line N. Each element is connected to L1 via an associated set of cascaded relay contacts arranged such that only one of the elements can be energized at any one time. When contacts K3 are closed to energize the broil element, contacts K7 and K10 are disconnected from L1. When contacts K3 are open, denergizing the broil element, L1 is connected to the K7 contacts. If the K7 contacts are closed energizing the bake element, contacts K10 are disconnected from L1. When K3 and K7 are open, preventing energization of both the broil and bake elements, contacts K10 are connected to L1 enabling energization of the convection element when contacts K10 are closed. The opening and closing of contacts K3, K7 and K10 are under the control of the oven controller for implementing the user selected cooking cycles, in a conventional manner. While in this embodiment, a cascaded relay arrangement is employed, in an alternative embodiment, each of the oven elements could be connected to L1 via its own separate relay.

Figure 7B:
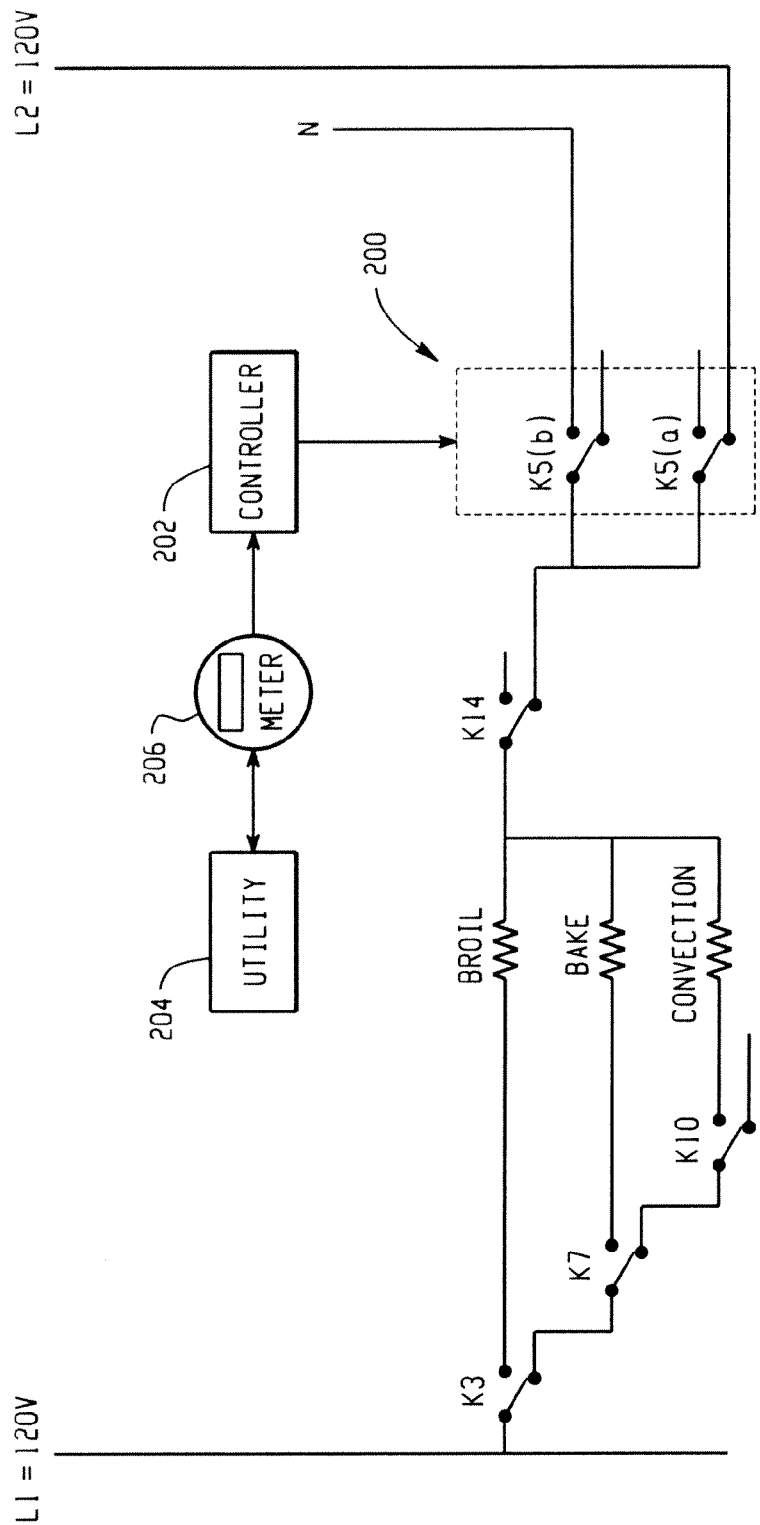

In accordance with the present disclosure, each of the oven elements is connected to L2 via contacts K14 and a demand response switch arrangement which in this embodiment comprises relay 200, but which could be any type of electromechanical or electronically controllable switching device. Contacts K14 are open when all oven elements are turned off, and are closed if any oven element is turned on, that is if a cooking or cleaning cycle has been selected by the user, thereby providing the conventional double line break. Demand response relay 200 is switchable between a first, normally closed state in which the contacts are closed to connect the elements to L2 via contacts K5, and a second, normally open state in which the contacts connect the heating elements to the neutral power line N. Therefore, in the normally closed state, the relay enables energization of the elements across the 240 volt L1, L2 power supply and in the normally open state the relay enables energization of the elements across the 120 volt L1, N power supply. It is desirable to avoid creating a direct arc between the L2 and N contacts when switching from L2 to N. In the embodiment illustrated in FIG. 7(b) which is otherwise identical to that of FIG. 7(a), relay 200 is provided in the form of a double pole double throw relay with one set of contacts K5(a) switchably connecting the heating elements to L2 and the other set of contacts K5(b) switchably connecting the heating elements to N. More particularly, when relay 200 is in its normally closed state, contacts K5(a) make the circuit between the heating elements and L2 and contacts K5(b) break the circuit between the heating elements and N. When relay 200 is in its normally open state, contacts K5(a) break the circuit between heating elements and L2 and contacts K5(b) make the circuit between the heating elements and neutral line N. Alternatively, an additional time delay relay could be employed between the normally open contacts of relay 200 and N which would be operative to close a short time after relay 200 closes across its normally open contacts. Depending upon the type of switching device employed other arrangements for avoiding arcing between L2 and N could be similarly employed.

The switching of the demand response relay contacts 200 is controlled by controller 202 responsive to demand response signals indicative of the operating state of the utility supplying power to the appliance in order to reduce peak power usage during high demand conditions. In this embodiment the operating state signal from the utility 204 is coupled to controller 202 via the smart utility meter 206, however, it could be sent directly to controller 202 or indirectly via other intervening devices.

For operation in the normal operating mode, the demand response relay 200 is in its normally closed state enabling energization of the elements across a first relatively high 240 volt voltage supply provided across L1 and L2. In this embodiment, when controller 202 receives a signal indicative of a state calling for operation of the cooking appliance in an energy saving mode, the controller switches demand response relay 200 to its normally open state enabling energization of the oven heating elements by a second relatively low 120 volt voltage supply provided across L1 and N. Reducing the available supply voltage by half reduces the power available to the elements to 25% of the power available across L1 and L2. Switching the power line from L2 to neutral eliminates the significant overpowering of the oven heating elements compared to what is really needed in actual use to maintain the setpoint temperature in the oven. For example, oven heating elements generally have a power rating high enough to preheat the oven very quickly and also get the oven into self-clean temperatures that are very high. However, operation at full power represents only a small percentage of the oven elements typical usage. Power requirements for maintaining steady state temperatures in the oven for typical cooking operations are much less. Thus while the switch to the 120 volt supply could significantly increase heat up times, it is not likely to significantly adversely affect the ability of the oven to maintain operating temperatures in the oven and hence not likely to adversely affect baking performance.

This arrangement also allows for an alternative embodiment which implements a power sharing mode during the energy saving mode to provide a significant reduction in peak power usage with less potential impact on oven performance by coordinating the switching of the demand response relay 200 with the cycling of the surface cooking elements. Maximum peak power usage occurs when an oven element is cycled ON simultaneously with one or more surface heating elements and both elements are energized by the 240 volt supply. By switching the oven elements to the 120 volt supply when a surface element is cycled ON, and switching back to the 240 volt supply when the surface element is cycled OFF, peak usage is significantly reduced with less impact on oven performance than if the demand response relay continuously enables energization of the oven elements only across L1 and N as in the previously described embodiment.

Figure 7C:
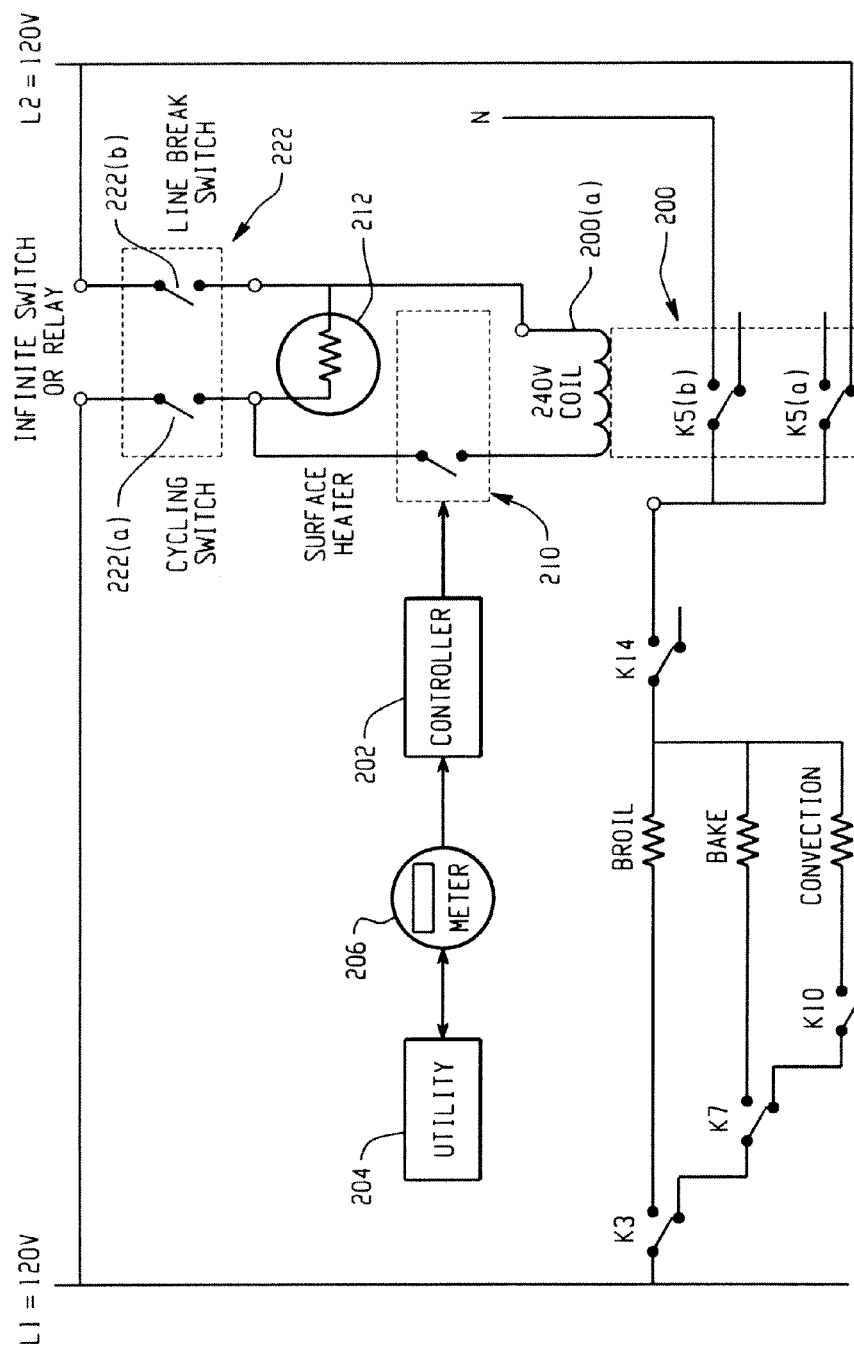
FIG. 7(c) is a simplified schematic diagram of an exemplary embodiment of a power control system for a cooking appliance with at least one surface heating unit and an oven further including a Demand Response Relay responsive to a utility state signal.

An embodiment of such an arrangement is illustrated schematically in FIG. 7(c). In FIG. 7(c) a surface heating element 212 is connected across power lines L1 and L2 via a cycling switch 222 comprising a set of cycling contacts 222(a) and a set of line break contacts 222(b) in conventional fashion. The cycling switch, which may be an infinite switch or a relay switch controlled by an electronic range controller of the type described with reference to range 100, will operate the surface unit 212 at the duty cycle, that is the percentage ON time, corresponding to the power level selected by the user. The three oven heating elements are coupled to L1 as previously described with reference to FIG. 7(a). These elements are also similarly selectively coupled across L2 or neutral line N via line break contacts 114 and a relay 200. However, in this arrangement, relay 200 is part of a demand response switch arrangement also comprising switch 210 which selectively connects the coil 200(a) of relay 200 in parallel with the surface heating unit 212. Switch 210 is switchable between a first state in which the contacts are open thereby disconnecting the relay coil 200(a) and disabling energization of the coil and a second state in which the contacts are closed to connect the coil 200(a) in parallel with the surface heating unit 212 thereby enabling energization of the coil across 240 volt supply provided by L1 and L2. In the illustrative embodiment of FIG. 7(c) switch 210 is a relay switch configured such that the aforementioned first state is its normally closed state, and the aforementioned second state is its normally open state. Switching of the relay contacts 210 is controlled by controller 202 responsive to demand response signals indicative of the operating state of the utility supplying power to the appliance in order to reduce peak power usage during high demand conditions. In the embodiment of FIG. 7(c) relay 200 is a double pole double throw relay which is operative in a first state as described with reference to FIG. 7(b) to couple the oven elements to L2 via contacts K5(a) and operative in a second state to couple the oven elements to neutral line N via contacts K5(b). Energization of the coil 200(a) of relay 200 places the relay in its first state; when the coil is not energized, the relay assumes its second state. By this arrangement, when operating in the energy savings mode relay 210 enables the cycling of relay 200 to be controlled by the cycling of heating element 212.

For operation in the normal operating mode, the demand response switch arrangement is in a first state with relay 210 in its first or open state preventing energization of the coil of relay 200 and the oven elements are connected to L2 for normal operation. When controller 202 receives a signal indicative of a state calling for operation of the cooking appliance in an energy saving mode, the controller switches the demand response switching arrangement to its second state by switching relay 210 to its second or closed state thereby connecting the coil 200(*a*) of relay 200 in parallel with the surface heating unit 212 whereby the coil 200(*a*) is energized whenever the surface heating unit 212 is energized. When the coil is energized the oven elements are connected to N rather than L2. Consequently, in the energy saving mode, the oven elements are connected to N when the surface unit is drawing power and connected to L2 when the surface unit is not drawing power.

Figure 8A:
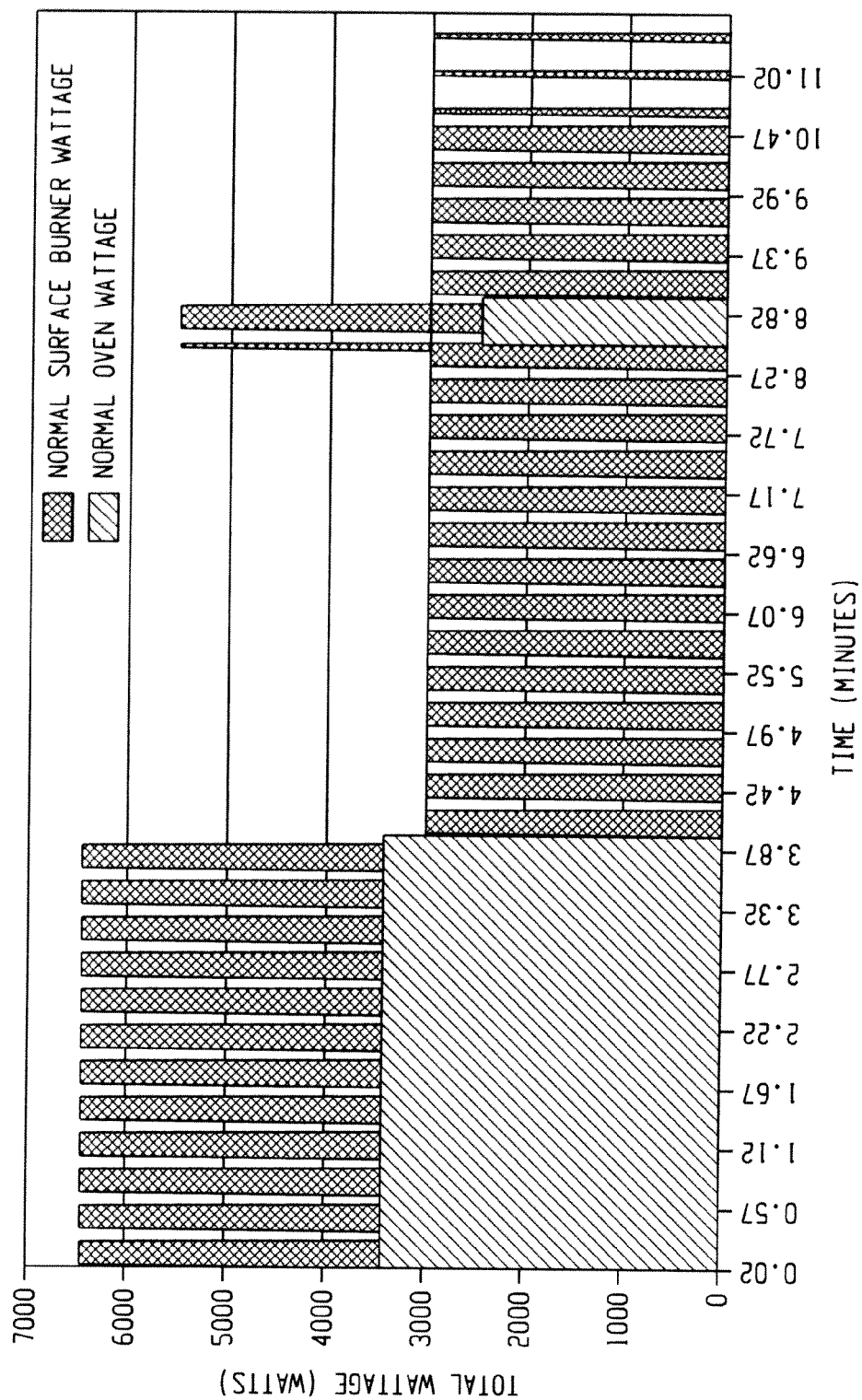
FIG. 8(a) illustrates exemplary power consumption by a cooking appliance employing the control system of FIG. 7(c) during normal operation.
Figure 8B:
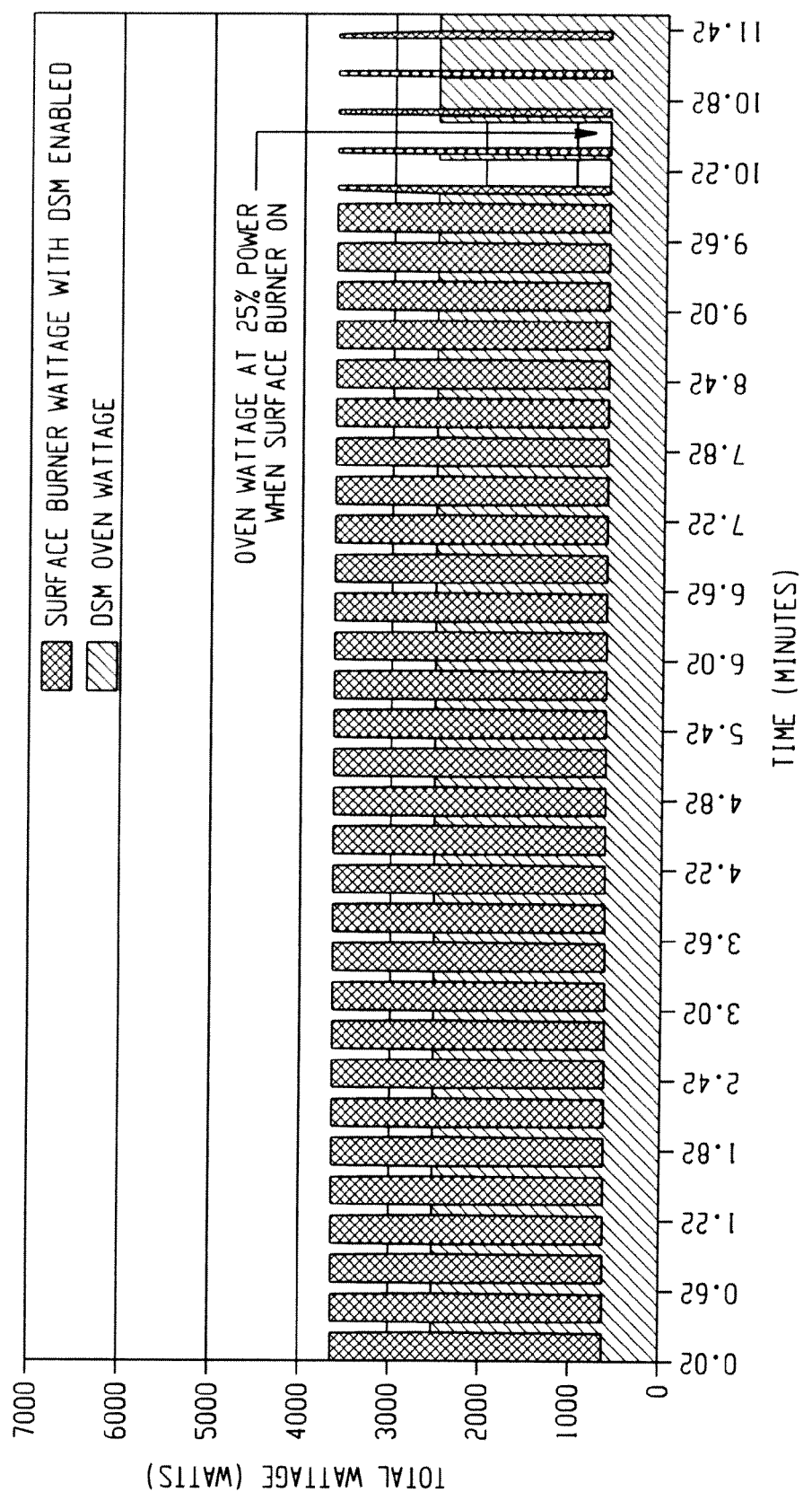
FIG. 8(b) illustrates exemplary power consumption by a cooking appliance employing the control system of FIG. 7(c) during power sharing mode.

FIGS. 8(*a*) and (*b*) graphically illustrate the effects of this power sharing arrangement on the peak power consumed by the appliance when the oven and at least one surface burner are in use simultaneously. During normal mode, illustrated in FIG. 8(*a*), the heating elements together operate at a peak power of about 6.5 kilowatts for the duration of high power usage pre-heat phase of oven operation, following the pre-heat phase when steady state temperature conditions prevail in the oven, the power required to maintain the selected temperature is significantly less, because the oven elements are de-energized for relatively long periods relative to the energized periods so the peak power points are spread out.

The example of FIG. 8(*b*) demonstrates the peak power reduction over approximately the same time period while implementing the power sharing method. Peak power is reduced to about 3.6 kilowatts over the entire simultaneous use cooking time. The present power sharing method energizes the oven element using the 120 volt power source during the ON portions of the surface element duty cycle when the surface element is energized, and energizes the oven element using the 240 power source during the OFF portion of the surface element duty cycle when the surface element is not energized. Since the oven element is rated for 240 volt operation, it operates at 100% of rated power during the OFF periods when no surface element is energized and operates at 25% of its rated power during the ON periods when at least one of the surface elements is energized for the duration of the peak demand period. This method essentially reduces peak power usage. Rather than operating a peak power of 6 kilowatts for a particular period of time, the appliance operates at a peak of 3.6 kilowatts. As displayed in FIG. 8(*a*),(*b*), the pre-heat cycle concludes sooner during normal mode operation. However, the power sharing method spreads power out over a longer period of time, thereby reducing the power demand at peak demand periods.

Consider the example of the user selecting the 75% power setting for a surface element, while operating the oven in the bake mode. The surface heating element is on at full 100% power for 75% of each duty cycle period, and off (0% power) for the remaining 25% of the duty cycle. Simultaneously, the oven heating element is switched to the 120 volt supply for 75% of the duty cycle when the surface is on, and is switched to the 240 volt supply for the 25% of the duty cycle when the surface element is cycled off, such that it will only run on full power for 25% of the duty cycle. For example, if the period for a duty cycle was one minute, 75% of the minute will power a surface heating element at full power and the oven heating element at a quarter power. The other 25% of the minute will be available to run the oven at full power. By avoiding operating oven and surface elements simultaneously across the 240 volt supply, this power sharing method reduces power demand spikes and spreads the power demand over a slightly longer cycle. The peaks in the power sharing duty cycle of FIG. 8(*b*) illustrate the 75% duty cycle wherein the surface burner runs at full power for 75% of the cycling period, with the oven running at a quarter power. The dips in the power sharing duty cycle represent the remaining 25% of the cycling period wherein the oven is able to run on full power.

The above description has assumed that a surface burner was being implemented on a high setting. However, surface burners are not always run on high and may instead be used on a medium or low power level. Using surface heating elements on a lower setting allows more power to be available to the oven. Accordingly, the power sharing cycle will depend on the setting of the surface heating elements.

Additionally, if multiple heating elements are not in use concurrently during a peak demand period, the duty cycle does not need to change. If the only heating element in use is the bake element, power sharing does not necessarily occur. A user can customize a device to enter the power sharing mode according to particular scenarios, such as when multiple elements are in use, or when a certain power usage is reached. For example, a user may set the system such that power sharing is triggered when at least an oven and surface burner are on, at least two surface burners, or at least two oven units, etc.

Although the power sharing system has been described with reference to a cooking appliance, this system is also contemplated for use across ranges, electric baseboard heating, electric water heaters, and other 240V resistive heating products.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for reducing peak power consumption in an electromechanically controlled cooking appliance, said system comprising:
a surface heating unit comprising at least one duty cycle controlled surface heating element;
a temperature controlled oven heating element;
a controller configured to receive and process utility state signals indicative of the operating state of an associated utility; and
a switch responsive to said controller, switchable between a first state and a second state for selectively coupling said oven heating element to a first relatively high voltage power supply and a second relatively low voltage power supply respectively, wherein said controller is configured to switch said switch to said first and second states as a function of said utility state signal.

2. The system according to claim 1, wherein said first power supply comprises L1 and L2 of a standard ac domestic power supply and said second power supply comprises L1 and N of said domestic power supply.

3. The system according to claim 1, wherein said switch is switched to its first state in response to a utility state signal indicative of a non-peak demand period and to its second state in response to a utility state signal indicative of a peak demand period.

4. The system according to claim 3, wherein said first state includes said first power supply and said second state includes said second power supply.

5. The system according to claim 1, wherein said switch comprises a double pole double throw relay.

6. The system according to claim 1, further including a time delay relay operative to close upon switching to said second state.

7. A power sharing method for reducing peak power consumption of a cooking appliance, said cooking appliance including at least one duty cycle controlled surface heating element and at least one oven heating element, wherein said at least one oven heating element is energized by a conventional 240 volt ac power supply, said method comprising:
- receiving and processing utility state signals by a controller, said signals being indicative of the operating state of an associated utility;
- associating said at least one oven heating element to a demand response switch switchable between a first state and a second state; and
- switching said demand response switch between said first and second state to selectively couple said at least one oven heating element to a first relatively high voltage power supply and a second relatively low voltage power supply respectively.

8. The method according to claim 7, wherein said controller is configured to switch said switch to said first and second states as a function of said utility state signal.

9. The method according to claim 7, wherein the switching of said switch is further coordinated with the cycling surface cooking elements.

10. The method according to claim 9, wherein said switch is switched to said second state when a surface cooking element is cycled ON, and switched to said first state when said surface cooking element is cycled OFF.

11. The method according to claim 7, wherein switching the demand response switch from said first state to said second state reduces the available supply voltage by about half.

12. The method according to claim 11, wherein switching the demand response switch from said first state to said second state reduces the power available to said oven heating elements by about 25%.

13. The method according to claim 12, wherein said power sharing method only occurs if multiple heating element are in use concurrently during a peak demand period.

14. A power sharing system for reducing peak power consumption of a cooking appliance during an energy savings mode, said system comprising;
- a surface heating unit comprising at least one surface heating element operative according to a duty cycle;
- an oven cavity, having one or more oven heating elements;
- a controller configured to receive and process a signal indicative of a current utility state of an associated utility; and
- a demand response switching arrangement responsive to a signal received from said controller, and operative to selectively couple said one or more oven heating elements to a first power supply and a second power supply, in concert with the ON and OFF portions of said duty cycle.

15. The power sharing system according to claim 14, wherein said switching arrangement comprises a relay, a switch, and a coil, wherein said coil is connected in parallel with said surface heating unit.

16. The power sharing system according to claim 15, wherein said switch is switchable between a first state and a second state, wherein said first state is a normally closed state, and said second state is a normally open state.

17. The power sharing system according to claim 16, wherein said controller is operable to switch said switch in response to said signal.

18. The power sharing system according to claim 15, wherein said relay is a double pole double throw relay.

19. The power sharing system according to claim 14, wherein said first power supply is a higher voltage supply than said second power supply and said demand response switching arrangement is configured to couple said one or more oven heating elements to said first power supply during the OFF portion of said duty cycle and to said second power supply during the ON portion of said duty cycle.

20. The power sharing system according to claim 14, wherein said demand switching arrangement and said first and second power supplies are configured to operate said one or more oven heating elements at 100% power during the OFF portion of said duty cycle and at 25% power during the ON portion of said duty cycle.

* * * * *

UNITED STATES PATENT AND TRADEMARK OFFICE
CERTIFICATE OF CORRECTION

| | |
|---|---|
| PATENT NO. | : 8,541,719 B2 |
| APPLICATION NO. | : 12/913129 |
| DATED | : September 24, 2013 |
| INVENTOR(S) | : Steurer |

Page 1 of 1

It is certified that error appears in the above-identified patent and that said Letters Patent is hereby corrected as shown below:

In the Specification

In Column 2, Line 15, delete "perforin" and insert -- perform --, therefor.

In Column 12, Line 37, delete "contacts 114" and insert -- contacts K14 --, therefor.

In the Claims

In Column 16, Line 3, in Claim 14, delete "comprising;" and insert -- comprising: --, therefor.

Signed and Sealed this
Eighteenth Day of February, 2014

Michelle K. Lee
*Deputy Director of the United States Patent and Trademark Office*